United States Patent
Hell et al.

(10) Patent No.: US 12,188,102 B2
(45) Date of Patent: Jan. 7, 2025

(54) METHOD FOR PRODUCING A TWIP STEEL SHEET HAVING AN AUSTENITIC MICROSTRUCTURE

(71) Applicant: ARCELORMITTAL, Luxembourg (LU)

(72) Inventors: Jean-Christophe Hell, Metz (FR); Nicolas Charbonnier, Metz (FR); Thierry Iung, Jarny (FR); Blandine Remy, Sanry les Vigy (FR)

(73) Assignee: ArcelorMittal, Luxembourg (LU)

( * ) Notice: Subject to any disclaimer, the term of this patent is extended or adjusted under 35 U.S.C. 154(b) by 770 days.

(21) Appl. No.: 16/302,988

(22) PCT Filed: May 23, 2017

(86) PCT No.: PCT/IB2017/000628
§ 371 (c)(1),
(2) Date: Nov. 19, 2018

(87) PCT Pub. No.: WO2017/203350
PCT Pub. Date: Nov. 30, 2017

(65) Prior Publication Data
US 2019/0276910 A1 Sep. 12, 2019

(30) Foreign Application Priority Data
May 24, 2016 (WO) .................. PCT/IB2016/000698

(51) Int. Cl.
*C22C 30/00* (2006.01)
*C21D 6/00* (2006.01)
(Continued)

(52) U.S. Cl.
CPC .............. *C21D 9/46* (2013.01); *C21D 6/005* (2013.01); *C21D 8/0273* (2013.01); *C22C 38/00* (2013.01); *C22C 38/001* (2013.01); *C22C 38/02* (2013.01); *C22C 38/04* (2013.01); *C22C 38/06* (2013.01); *C22C 38/08* (2013.01); *C22C 38/12* (2013.01); *C22C 38/16* (2013.01); *C22C 38/18* (2013.01); *C22C 38/22* (2013.01); *C22C 38/24* (2013.01); *C22C 38/28* (2013.01); *C22C 38/32* (2013.01); *C22C 38/42* (2013.01); *C22C 38/44* (2013.01); *C22C 38/46* (2013.01); *C22C 38/58* (2013.01);
(Continued)

(58) Field of Classification Search
CPC ............ C21D 9/46; C21D 6/005; C22C 38/00
See application file for complete search history.

(56) References Cited

U.S. PATENT DOCUMENTS 9,234,254 B2   1/2016 Eguchi et al.
2008/0035248 A1 2/2008 Cugy et al.
(Continued)

FOREIGN PATENT DOCUMENTS

CN    101328565 A    12/2008
CN    101956134 A    1/2011
(Continued)

OTHER PUBLICATIONS

KR20090070502A English translation (Year: 2020).*
Total Materia ("Annealing of aluminum and aluminum alloys", http://www.totalmateria.com/Article139.htm) (Year: 2006).*
Wang et al ("Investigation of deformation and microstructural evolution in Grade 91 ferritic-martensitic steel by in situ high-energy X-rays", Acta Materialia 62 (2014) 239-249) (Year: 2014).*
Vasilyev et al.("Effect of Alloying on the SelfDiffusion Activation Energy in ylron", ISSN 10637834, Physics of the Solid State, 2011, vol. 53, No. 11, pp. 2194-2200) (Year: 2011).*
Kermanpur et al.("Effect of strain-induced martensite on the formation of nanocrystalline 316L stainless steel after cold rolling and annealing", Materials Science and Engineering A 519 (2009) 46-50) (Year: 2009).*
Rimek D et al., "Prediction of Mechanical Properties of Carbon Steels After Hot and Cold Forming by Means of Fast Microstructure Analysis, " Database Inspection, Sep. 2014, The Institution of Electrical Engineers, Stevenage, GB; and also in Steel Research International Wiley-VCH Verlag Germany, Apr. 8, 2014, pp. 1369-1378, vol. 85, No. 9., XP002763866 in the ISR of PCT/IB2017/000628, Jul. 7, 2017.

(Continued)

*Primary Examiner* — Robert S Jones, Jr.
*Assistant Examiner* — Jiangtian Xu
(74) *Attorney, Agent, or Firm* — Davidson Kappel LLC

(57) ABSTRACT

A method for manufacturing a recovered steel sheet having an austenitic matrix presenting at least one mechanical property (M) equal or above a target value $M_{target}$ is provided. The method includes a calibrating process involving heat treatments on at least 2 samples of the steel, corresponding to Pareq values P, submitting said samples to X-ray diffraction so as to obtain spectrums including a main peak whose width at mid height FWHM is being measured, measuring a mechanical property (M) of said samples, measuring a recovery or recrystallization state of each sample, drawing a curve of M as a function of FWMH in a domain where the samples are recovered from 0 to 100%, but not recrystallized. The method further includes calculating a $FWHM_{target}$ corresponding to a target mechanical property $M_{target}$, determining a pareq value $P_{target}$ of the heat treatment to perform to reach $M_{target}$ and selecting a time $t_{target}$ and a temperature $T°_{target}$ corresponding to the $P_{target}$ value. The method further includes feeding a recrystallized steel sheet having a $M_{recrystallization}$, cold-rolling the recrystallized steel sheet in order to obtain a steel sheet having a $M_{cold-roll}$ and annealing the cold rolled steel sheet at a temperature $T°_{target}$ during a time $t_{target}$.

21 Claims, No Drawings

(51) Int. Cl.
*C21D 8/02* (2006.01)
*C21D 9/46* (2006.01)
*C22C 38/00* (2006.01)
*C22C 38/02* (2006.01)
*C22C 38/04* (2006.01)
*C22C 38/06* (2006.01)
*C22C 38/08* (2006.01)
*C22C 38/12* (2006.01)
*C22C 38/16* (2006.01)
*C22C 38/18* (2006.01)
*C22C 38/22* (2006.01)
*C22C 38/24* (2006.01)
*C22C 38/28* (2006.01)
*C22C 38/32* (2006.01)
*C22C 38/42* (2006.01)
*C22C 38/44* (2006.01)
*C22C 38/46* (2006.01)
*C22C 38/58* (2006.01)

(52) U.S. Cl.
CPC ......... *C21D 8/0205* (2013.01); *C21D 8/0236* (2013.01); *C21D 2201/02* (2013.01); *C21D 2211/001* (2013.01)

(56) References Cited

U.S. PATENT DOCUMENTS

| | | |
|---|---|---|
| 2008/0035249 A1 | 2/2008 | Scott et al. |
| 2009/0308499 A1 | 12/2009 | Scott et al. |
| 2010/0037993 A1 | 2/2010 | Kim et al. |
| 2010/0258218 A1 | 10/2010 | Hong et al. |
| 2013/0209833 A1 | 8/2013 | Scott et al. |
| 2014/0334966 A1 | 11/2014 | Sakurada et al. |
| 2015/0078954 A1* | 3/2015 | Bouzekri ............... C22C 38/58 420/73 |

FOREIGN PATENT DOCUMENTS

| | | | |
|---|---|---|---|
| CN | 102296232 | A | 12/2011 |
| CN | 102345077 | | 2/2012 |
| CN | 102459677 | A | 5/2012 |
| CN | 102839328 | A | 12/2012 |
| CN | 104711492 | A | 6/2015 |
| EP | 1036853 | A1 | 9/2000 |
| KR | 20090070502 | A * | 7/2009 |
| KR | 20140013333 | A * | 2/2014 |
| KR | 20170075916 | | 7/2017 |
| RU | 2361931 | C2 | 7/2009 |
| RU | 2417265 | C2 | 4/2011 |
| RU | 2554264 | C2 | 6/2015 |

OTHER PUBLICATIONS

Boumaiza A et al., "The nondestructive estimation of mechanical properties of a carbon steel by X-ray diffraction peak broadening," Database Inspection, Jul. 2009, The Institution of Electrical Engineers, Stevenage, GB; abstract XP002763867 in the ISR of PCT/IB2017/000628, Jul. 7, 2017.
International Search Report for PCT/IB2017/000628, Jul. 7, 2017.

* cited by examiner

METHOD FOR PRODUCING A TWIP STEEL SHEET HAVING AN AUSTENITIC MICROSTRUCTURE

FIELD OF THE INVENTION

The present invention relates to a method for producing a recovered steel sheet having an austenitic matrix. The invention is particularly well suited for the manufacture of automotive vehicles.

BACKGROUND

With a view of saving the weight of vehicles, it is known to use high strength steels for the manufacture of automobile vehicle. For example for the manufacture of structural parts, mechanical properties of such steels have to be improved. However, even if the strength of the steel is improved, the elongation and therefore the formability of high steels decreased. In order to overcome these problems, recovered steel sheets, in particular, twinning induced plasticity steels (TWIP steels) having good formability have appeared. Even if the product shows a very good formability, mechanical properties such as Ultimate Tensile Stress and Yield Stress may not be high enough to fulfill automotive application.

To improve the strength of these steels while keeping good workability, it is known to induce a high density of twins by cold-rolling followed by a recovery treatment removing dislocations but keeping the twins.

SUMMARY OF THE INVENTION

However, by applying such methods, there is a risk that the expected mechanical properties are not obtained. Indeed, the man skilled in the art can only follow the known methods and then measure the mechanical properties of the obtained steel sheet to see if the desired mechanical properties are achieved. It is not possible to adapt the conditions of the method in order to obtain expected mechanical properties.

Thus, an object of the present invention is to solve the above drawbacks by providing a method for manufacturing a recovered steel sheet presenting at least one expected mechanical property, such mechanical property being improved. Another object is to provide a recovered steel sheet having such improved mechanical properties.

This object is achieved by providing a method according to a first embodiment of the present invention for the manufacture of a TWIP steel sheet. In accordance with this embodiment, a method for manufacturing a recovered steel sheet having an austenitic matrix presenting at least one mechanical property (M) equal or above a target value $M_{target}$ whose composition comprises, in weight: $0.1<C<1.2\%$, $13.0 \leq Mn<25.0\%$, $S \leq 0.030\%$, $P \leq 0.080\%$, $N \leq 0.1\%$, $Si \leq 3.0\%$, and on a purely optional basis, one or more elements such as $Nb \leq 0.5\%$, $B \leq 0.005\%$, $Cr \leq 1.0\%$, $Mo \leq 0.40\%$, $Ni \leq 1.0\%$, $Cu \leq 5.0\%$, $Ti \leq 0.5\%$, $V \leq 2.5\%$, $Al \leq 4.0\%$, the remainder of the composition making up of iron and inevitable impurities resulting from development. The method comprises:

A. calibrating, wherein the calibrating includes:
  I. performing heat treatments between 40° and 900° C. during 40 seconds to 60 minutes on at least 2 samples of said steel, corresponding to Pareq values P,
  II. submitting said samples to X-ray diffraction so as to obtain spectrums including a main peak whose width at mid height FWMH is being measured,
  III. measuring a mechanical property (M) of said samples,
  IV. measuring a recovery or recrystallization state of each sample,
  V. drawing a curve of M as a function of FWMH in a domain where the samples are recovered from 0 to 100%, but not recrystallized,
B. calculating, wherein the calculating includes:
  I. determining a value $FWHM_{target}$ corresponding to a target mechanical property $M_{target}$,
  II. determining a pareq value $P_{target}$ of the heat treatment to perform to reach $M_{target}$ and
  III. selecting a time $t_{target}$ and a temperature $T°_{target}$ corresponding to the $P_{target}$ value,
C. feeding a recrystallized steel sheet having a $M_{recrystallization}$,
D. cold-rolling the recrystallized steel sheet in order to obtain a steel sheet having a $M_{cold-roll}$ and
E. annealing the cold rolled steel sheet at a temperature $T°_{target}$ during a time $t_{target}$.

Another object is achieved by providing a TWIP steel sheet in accordance with a second embodiment of the present invention obtained by performing the steps according to the first embodiment.

Other characteristics and advantages of the present invention will become apparent from the following detailed description of the invention.

DETAILED DESCRIPTION

The following terms will be defined:
M: mechanical property,
$M_{target}$: target value of the mechanical property,
$M_{recrystallisation}$: mechanical property after a recrystallization annealing,
$M_{cold-roll}$: mechanical property after a cold-rolling,
UTS: ultimate tensile strength,
TE: total elongation,
P: pareq value,
$P_{target}$: target value of pareq,
FWHM: full width at half maximum of X-ray diffraction spectrum and
$FWHM_{target}$: target value of the full width at half maximum of X-ray diffraction spectrum.

The present invention relates to a method for manufacturing a recovered steel sheet having an austenitic matrix presenting at least one mechanical property (M) equal or above a target value $M_{target}$ whose composition comprises, in weight:
  $0.1<C<1.2\%$,
  $13.0 \leq Mn<25.0\%$,
  $S \leq 0.030\%$,
  $P \leq 0.080\%$,
  $N \leq 0.1\%$,
  $Si \leq 3.0\%$,
  and on a purely optional basis, one or more elements such as
  $Nb \leq 0.5\%$,
  $B \leq 0.005\%$,
  $Cr \leq 1.0\%$,
  $Mo \leq 0.40\%$,
  $Ni \leq 1.0\%$,
  $Cu \leq 5.0\%$,
  $Ti \leq 0.5\%$,
  $V \leq 2.5\%$,
  $Al \leq 4.0\%$, the remainder of the composition making up of iron and inevitable impurities resulting from the development, such method comprising the steps consisting in:

A. a calibration step wherein:
  I. at least 2 samples of said steel having undergone heat treatments between 40° and 900° C. during 40 seconds to 60 minutes, corresponding to Pareq values P are prepared,
  II. said samples are submitted to X-ray diffraction so as to obtain spectrums including a main peak whose width at mid height FWHM is being measured,
  III. M of such samples is being measured,
  IV. the recovery or recrystallization state of each sample is being measured,
  V. the curve of M as a function of FWMH is being drawn in the domain where the samples are recovered from 0 to 100%, but not recrystallized, B. a calculation step wherein:
  I. the value of $FWHM_{target}$ corresponding to the $M_{target}$ is being determined,
  II. the pareq value $P_{target}$ of the heat treatment to perform to reach such $M_{target}$ is being determined and
  III. a time $t_{target}$ and a temperature $T°_{target}$ corresponding to the $P_{target}$ value are being selected, C. a feeding step of a recrystallized steel sheet having a $M_{recrystallization}$, D. a cold-rolling step in order to obtain a steel sheet having a $M_{cold-roll}$ and E. an annealing step performed at a temperature $T°_{target}$ during a time $t_{target}$.

Without willing to be bound by any theory it seems that when the method according to the present invention is applied, it makes it possible to obtain process parameters of the annealing step E) in order to acquire a recovered steel sheet, in particular a TWIP steel sheet, having the expected improved mechanical properties.

Regarding the chemical composition of the steel, C plays an important role in the formation of the microstructure and the mechanical properties. It increases the stacking fault energy and promotes stability of the austenitic phase. When combined with a Mn content ranging from 13.0 to 25.0% by weight, this stability is achieved for a carbon content of 0.5% or higher. In case there are vanadium carbides, a high Mn content may increase the solubility of vanadium carbide (VC) in austenite. However, for a C content above 1.2%, there is a risk that the ductility decreases due to for example an excessive precipitation of vanadium carbides or carbonitrides. Preferably, the carbon content is between 0.4 and 1.2%, more preferably between 0.5 and 1.0% by weight so as to obtain sufficient strength.

Mn is also an essential element for increasing the strength, for increasing the stacking fault energy and for stabilizing the austenitic phase. If its content is less than 13.0%, there is a risk of martensitic phases forming, which very appreciably reduce the deformability. Moreover, when the manganese content is greater than 25.0%, formation of twins is suppressed, and accordingly, although the strength increases, the ductility at room temperature is degraded. Preferably, the manganese content is between 15.0 and 24.0% and more preferably between 17.0 and 24.0% so as to optimize the stacking fault energy and to prevent the formation of martensite under the effect of a deformation. Moreover, when the Mn content is greater than 24.0%, the mode of deformation by twinning is less favored than the mode of deformation by perfect dislocation glide.

Al is a particularly effective element for the deoxidation of steel. Like C, it increases the stacking fault energy which reduces the risk of forming deformation martensite, thereby improving ductility and delayed fracture resistance. However, Al is a drawback if it is present in excess in steels having a high Mn content, because Mn increases the solubility of nitrogen in liquid iron. If an excessively large amount of Al is present in the steel, the N, which combines with Al, precipitates in the form of aluminum nitrides (AlN) that impede the migration of grain boundaries during hot conversion and very appreciably increases the risk of cracks appearing in continuous casting. In addition, as will be explained later, a sufficient amount of N must be available in order to form fine precipitates, essentially of carbonitrides. Preferably, the Al content is below or equal to 2%. When the Al content is greater than 4.0%, there is a risk that the formation of twins is suppressed decreasing the ductility. Preferably, the amount of Al is above 0.06% and more preferably above 0.7%.

Correspondingly, the nitrogen content must be 0.1% or less so as to prevent the precipitation of AlN and the formation of volume defects (blisters) during solidification. In addition, when elements capable of precipitating in the form of nitrides, such as vanadium, niobium, titanium, chromium, molybdenum and boron, the nitrogen content must not exceed 0.1%

According to embodiments of the present invention, the amount of V is below or equal to 2.5%, preferably between 0.1 and 1.0%. Preferably, V forms precipitates. Preferably, the volumic fraction of such elements in steel is between 0.0001 and 0.025%. Preferably, vanadium elements are mostly localized in intragranular position. Advantageously, vanadium elements have a mean size below 7 nm, preferably between 1 and 5 nm and more preferably between 0.2 and 4.0 nm Silicon is also an effective element for deoxidizing steel and for solid-phase hardening. However, above a content of 3%, it reduces the elongation and tends to form undesirable oxides during certain assembly processes, and it must therefore be kept below this limit. Preferably, the content of silicon is below or equal to 0.6%.

Sulfur and phosphorus are impurities that embrittle the grain boundaries. Their respective contents must not exceed 0.030 and 0.080% so as to maintain sufficient hot ductility.

Some Boron may be added up to 0.005%, preferably up to 0.001%. This element segregates at the grain boundaries and increases their cohesion. Without intending to be bound to a theory, it is believed that this leads to a reduction in the residual stresses after shaping by pressing, and to better resistance to corrosion under stress of the thereby shaped parts. This element segregates at the austenitic grain boundaries and increases their cohesion. Boron precipitates for example in the form of borocarbides and boronitrides.

Nickel may be used optionally for increasing the strength of the steel by solution hardening. However, it is desirable, among others for cost reasons, to limit the nickel content to a maximum content of 1.0% or less and preferably between below 0.3%.

Likewise, optionally, an addition of copper with a content not exceeding 5% is one means of hardening the steel by precipitation of copper metal. However, above this content, copper is responsible for the appearance of surface defects in hot-rolled sheet. Preferably, the amount of copper is below 2.0%. Preferably, the amount of Cu is above 0.1%.

Titanium and Niobium are also elements that may optionally be used to achieve hardening and strengthening by forming precipitates. However, when the Nb or Ti content is greater than 0.50%, there is a risk that an excessive precipitation may cause a reduction in toughness, which has to be avoided. Preferably, the amount of Ti is between 0.040 and 0.50% by weight or between 0.030% and 0.130% by weight. Preferably, the titanium content is between 0.060% and 0.40 and for example between 0.060% and 0.110% by weight. Preferably, the amount of Nb is above 0.01% and more preferably between 0.070 and 0.50% by weight or 0.040 and 0.220%. Preferably, the niobium content is between 0.090% and 0.40% and advantageously between 0.090% and 0.200% by weight.

Chromium and Molybdenum may be used as optional element for increasing the strength of the steel by solution hardening. However, since chromium reduces the stacking fault energy, its content must not exceed 1.0% and preferably between 0.070% and 0.6%. Preferably, the chromium content is between 0.20 and 0.5%. Molybdenum may be added in an amount of 0.40% or less, preferably in an amount between 0.14 and 0.40%.

Furthermore, without willing to be bound by any theory, it seems that precipitates of vanadium, titanium, niobium, chromium and molybdenum can reduce the sensitivity to delayed cracking, and do so without degrading the ductility and toughness properties. Thus, preferably, at least one element chosen from titanium, niobium, chromium and molybdenum under the form of carbides, nitrides and carbonitrides are present in the steel.

According to embodiments of the present invention, the method comprises a calibration step A.I) wherein at least 2 samples of the steel sheet having undergone heat treatments between 40° and 900° C. during 40 seconds to 60 minutes, corresponding to Pareq values P are prepared. In this step, the parameter called Pareq is determined to be able to compare different heat treatments carried out at different temperatures for different times, it is defined by:

$$Pareq = -0.67 * \log(\int -\Delta H/RT) * dt)$$

With $\Delta H$: energy of diffusion of iron in iron (equal to 300 KJ/mol), T=temperature of the cycle, the integration being over the heat treatment time. The hotter or longer the heat treatment, the lower the Pareq value. Two different heat treatments having an identical Pareq value will give the same result on the same grade of steel. Preferably, the Pareq value is above 14.2, more preferably between 14.2 and 25 and more preferably between 14.2 and 18.

Then, during the step A.II), the samples are submitted to X-ray diffraction so as to obtain spectrums including a main peak whose the full width at half maximum FWHM is being measured. The X-ray diffraction is a non-destructive analytical technique which provides detailed information about the internal lattice of crystalline substances, including unit cell dimensions, bond-lengths, bond-angles, and details of site-ordering. Directly related is single-crystal refinement, where the data generated from the X-ray analysis is interpreted and refined to obtain the crystal structure. Usually, an X-ray crystallography is the tool used for identifying such crystal structure. According to the present invention, the steel sheet has an austenitic matrix, the austenitic matrix having a face-centered cubic system. Thus, preferably, the main peak whose the full width at half maximum FWHM is measured corresponds to the Miller index [311]. Indeed, it is believed that this peak, being characteristic of the austenitic system, is the best representative of the dislocation density impact.

Then, during the step A.III), M of such samples is being measured. Preferably, M is the Ultimate tensile Strength (UTS), the total elongation (TE) or both (UTS*TE).

Then, during the step A.IV, the recovery or recrystallization state of each sample is being measured. Preferably, such states are measured with Scanning Electron Microscope (SEM) and EBSD (Electron Back Scattered Diffraction) or Transmission Electron Microscope (TEM).

Then, during step A.V), a curve of M as a function of FWMH is being drawn in the domain where the samples are recovered from 0 to 100%, but not recrystallized.

According to an embodiment of the present invention, a calculation step B) is realized. The calculation comprises a step B.I) wherein the value of $FWHM_{target}$ corresponding to the $M_{target}$ is being determined. Preferably, $FWHM_{target}$ is above 1.0° and advantageously between 1.0 and 1.5°.

In one preferred embodiment wherein M is UTS, the determination of FWHM is achieved with the following equation:

$$UTS_{target} = UTS_{cold-roll} - (UTS_{cold-roll} - UTS_{recrystallization}) * (\exp((-FWHM + 2.3)/2.3) - 1)^4)$$

In this case, preferably, the $UTS_{target}$ is above or equal to 1430 MPa and more preferably between 1430 and 2000 MPa.

In another preferred embodiment wherein M is TE, the determination of FWHM during the calculation step B.I) is achieved with the following equation:

$$TE_{target} = TE_{cold-roll} - (TE_{recrystallization} - UTS_{cold-roll}) * (\exp((-FWHM + 2.3)/2.3) - 1)^{2.5})$$

In this case, preferably, $TE_{target}$ is above or equal to 15% and more preferably between 15 and 30%.

In another preferred embodiment, wherein M is UTS*TE, the determination of FWHM during the calculation step B.I) is achieved with the following equation:

$$UTS_{target} * TE_{target} = 100000 * (1 - 0.5 FWHM)$$

In this case, preferably, $UTS_{target} * TE_{target}$ is above 21000 and more preferably between 21000 and 60000, $TE_{target}$ being maximum of 30%.

Then, the step B.II), wherein the pareq value $P_{target}$ of the heat treatment to perform to reach such $M_{target}$ is determined, is performed. Preferably, $P_{target}$ is above 14.2, more preferably between 14.2 and 25 and more preferably, between 14.2 and 18.

After, the step B.III), consisting in selecting a time $t_{target}$ and a temperature $T°_{target}$ corresponding to the $P_{target}$ value, is realized. Preferably, $T°_{target}$ is between 40° and 900° C. and the $t_{target}$ is between 40 seconds to 60 minutes.

Then, the method according to an embodiment of the present invention comprises a feeding step of a recrystallized a steel sheet having a $M_{recrystallization}$. Indeed, preferably, the steel sheet is recrystallized after a recrystallization annealing performed at a temperature between 70° and 900° C. For example, the recrystallization is realized during 10 to 500 seconds, preferably between 60 and 180 seconds.

In one preferred embodiment, when M is UTS, $UTS_{recrystallization}$ is above 800 MPa, preferably between 800 and 1400 MPa and more preferably between 1000 and 1400 MPa.

In another preferred embodiment, when M is TE, $TE_{recrystallization}$ is above 20%, preferably above 30% and more preferably between 30 and 70%.

In another preferred embodiment, when M is TE*UTS, $TE_{recrystallization} * UTS$ recrystallization is above 16000, more preferably above 24000 and advantageously between 24000 and 98000.

Then, a cold-rolling step D) is realized in order to obtain a steel sheet having a $M_{cold-roll}$. Preferably, the reduction rate is between 1 to 50%, preferably between 1 and 25% or between 26 and 50%. It allows the reduction of the steel thickness. Moreover, the steel sheet manufactured according to the aforesaid method, may have increased strength through strain hardening by undergoing this rolling step. Additionally, this step induces a high density of twins improving thus the mechanical properties of the steel sheet.

In one preferred embodiment, when M is UTS, $UTS_{cold-roll}$ is above 1000, preferably above 1200 MPa and advantageously above 1400 MPa.

In another preferred embodiment, when M is TE, $TE_{cold-roll}$ is above 2%, more preferably between 2 and 50%.

In another preferred embodiment, when M is TE*UTS, $TE_{cold-roll}$*UTS cold-roll is above 2000, preferably 2400 and more preferably between 2400 and 70000.

Then, an annealing step E) is performed at a temperature $T°_{target}$ during a time $t_{target}$.

After the second cold-rolling, a hot-dip coating step G) can be performed. Preferably, the step G) is realized with an aluminum-based bath or a zinc-based bath.

In a preferred embodiment, the hot-dip galvanizing step is performed with an aluminum-based bath comprises less than 15% Si, less than 5.0% Fe, optionally 0.1 to 8.0% Mg and optionally 0.1 to 30.0% Zn, the remainder being Al.

In another preferred embodiment, the hot-dip galvanizing step is performed with a zinc-based bath comprises 0.01-8.0% Al, optionally 0.2-8.0% Mg, the remainder being Zn.

The molten bath can also comprise unavoidable impurities and residuals elements from feeding ingots or from the passage of the steel sheet in the molten bath. For example, the optionally impurities are chosen from Sr, Sb, Pb, Ti, Ca, Mn, Sn, La, Ce, Cr, Zr or Bi, the content by weight of each additional element being inferior to 0.3% by weight. The residual elements from feeding ingots or from the passage of the steel sheet in the molten bath can be iron with a content up to 5.0%, preferably 3.0%, by weight.

For example, an annealing step can be performed after the coating deposition in order to obtain a galvannealed steel sheet.

Thus, a recovered steel sheet having an austenitic matrix at least one expected and improved mechanical property is obtained by applying the method according to the present invention.

Example

In this example, steel sheets having the following weight composition were used:

| C (%) | Mn (%) | Si (%) | P (%) | Al (%) | Cu (%) | Mo (%) | V (%) | N (%) | Nb (%) | Cr (%) | Ni (%) |
|---|---|---|---|---|---|---|---|---|---|---|---|
| 0.583 | 21.9 | 0.226 | 0.03 | 0 | 0.031 | 0.01 | 0.206 | 0.0148 | 0 | 0.183 | 0.06 |

In this example, the recovered steel sheet had a target value of the mechanical property $M_{target}$ is $UTS_{target}$ being of 1512 MPa. Thanks to the calibration step A, the value of $FMHM_{target}$ corresponding to the $UTS_{target}$ was determined, the $FMHM_{target}$ was of 1.096. The $P_{target}$ of the heat treatment to perform to reach $UTS_{target}$ was determined, it was of 14.39. Then, the selected time $t_{target}$ was of 40 seconds and the selected temperature $T°_{target}$ was of 650° C.

Thus, firstly, Trials 1 and 2 were heated and hot-rolled at a temperature of 1200° C. The finishing temperature of hot-rolling was set to 890° C. and the coiling was performed at 400° C. after the hot-rolling. Then, a $1^{st}$ cold-rolling was realized with a cold-rolling reduction ratio of 50%. Thereafter, a recrystallization annealing was performed at 825° C. during 180 seconds. The value of $UTS_{recrystallization}$ obtained was of 980 MPa. Afterwards, a $2^{nd}$ cold-rolling was realized with a cold-rolling reduction ratio of 30%. The value of $UTS_{cold-roll}$ obtained was of 1540 MPa.

Then, Trial 1 was annealed at 650° C. during 40 seconds according to the present invention. After this annealing, Trial 1 was recovered. The UTS of Trial 1 was of 1512.5 MPa.

Trial 2 was annealed at 650° C. during 90 seconds, i.e. $t_{target}$ and $T°_{target}$ determined by the method of the present invention were not respected. After this annealing, Trial 2 was recrystallized. UTS of Trial 2 was of 1415.15 MPa. The FMHM of Trial 2 was of 0.989 and the P was of 14.12, i.e. outside the range of the present invention.

Results show that when the method according to the present invention is applied, a recovered steel sheet having expected mechanical properties can be obtained.

What is claimed is:

1. A method for manufacturing a recovered steel sheet having an austenitic matrix presenting at least one mechanical property (M) equal or above a target value $M_{target}$ whose composition comprises, in weight:
   0.1<C<1.2%,
   13.0≤Mn<25.0%,
   S≤0.030%,
   P≤0.080%,
   N≤0.1%,
   Si≤3.0%,
the remainder of the composition making up of iron and inevitable impurities resulting from development,
   the method comprising:
   A. calibrating, wherein the calibrating includes:
      I. performing heat treatments between 400 and 900° C. during 40 seconds to 60 minutes on at least 2 samples of said steel, the heat treatments having Pareq values P, Pareq being defined by an equation:

Pareq=−0.67*log(∫−ΔH/RT)*dt), with ΔH: energy of diffusion of iron in iron, T=temperature of the heat treatment, the integration being over the heat treatment time, the heat treatments being different heat treatments carried out at different temperatures for different times,
      II. submitting said samples to X-ray diffraction so as to obtain spectrums including a main peak whose width at mid height FWHM is being measured,
      III. measuring a mechanical property (M) of said samples,
      IV. identifying a recovery or recrystallization state of each sample,
      V. drawing a curve of M as a function of FWHM in a domain where the samples are recovered from 0 to 100%, but not recrystallized,
   B. calculating, wherein the calculating includes:
      I. determining, from the curve, a value $FWHM_{target}$ corresponding to a target mechanical property $M_{target}$,
      II. determining a pareq value $P_{target}$ of the heat treatment to perform to reach $M_{target}$ based on the M and Pareq values P determined during the calibrating, and
      III selecting a time $t_{target}$ and a temperature $T°_{target}$ for the $P_{target}$ value using the equation, C. feeding a recrystallized steel sheet having a $M_{recrystallization}$, D. cold-rolling the recrystallized steel sheet in order to obtain a steel sheet having a $M_{cold-roll}$ and E. annealing the cold rolled steel sheet at the selected temperature $T°_{target}$ for the selected time $t_{target}$ to achieve at least one mechanical property M equal or above the target value $M_{target}$.

2. The method according to claim 1, wherein the composition further comprises one or more of Nb≤0.5%,
B≤0.005%,
Cr≤1.0%,
Mo≤0.40%,
Ni≤1.0%,
Cu≤5.0%,
Ti≤0.5%,
V≤2.5%, and/or
Al≤4.0%.

3. The method according to claim 1, wherein the steel sheet is recrystallized after a recrystallization annealing realized between 70° and 900° C.

4. The method according to claim 1, wherein the cold-rolling is realized with a reduction rate between 1 and 50%.

5. The method according to claim 1, wherein during the calibration step A.II), the main peak whose width at mid height FWHM is measured corresponds to a Miller index [311].

6. The method according to claim 1, wherein M is an Ultimate tensile Strength (UTS), a total elongation (TE), or UTS*TE.

7. The method according to claim 6, wherein when M is UTS, the determination of FWHM during the calculation step B.I) is achieved with the following equation:

$$UTS_{target} = UTS_{cold-roll} - (UTS_{cold-roll} - UTS_{recrystallization}) * (\exp((-FWHM+2.3)/2.3)-1)^4).$$

8. The method according to claim 6, wherein when the M is UTS, the $UTS_{target}$ is above or equal to 1430 MPa.

9. The method according to claim 8, wherein the $UTS_{target}$ is between 1430 and 2000 MPa.

10. The method according to claim 6, wherein when M is TE, the determination of FWHM during the calculation step B.I) is achieved with the following equation:

$$TE_{target} = TE_{cold-roll} - (TE_{recrystallization} - UTS_{cold-roll}) * (\exp((-FWHM+2.3)/2.3)-1)^{2.5}).$$

11. The method according to claim 6, wherein when M is TE, $TE_{target}$ is above or equal to 15%.

12. The method according to claim 11, wherein $TE_{target}$ is between 15 and 30%.

13. The method according to claim 6, wherein when M is TE*UTS, the determination of FWHM during the calculation step B.I) is achieved with the following equation:

$$UTS_{target} * TE_{target} = 100000 * (1 - 0.5 FWHM).$$

14. The method according to claim 1, wherein when M is TE*UTS, $UTS_{target} * TE_{target}$ is above 21000, $TE_{target}$ being maximum of 30%.

15. The method according to claim 14, wherein $UTS_{target} * TE_{target}$ is between 21000 and 60000, $TE_{target}$ being maximum of 30%.

16. The method according to claim 1, wherein $FWHM_{target}$ is above or equal 1.0°.

17. The method according to claim 15, wherein $FWHM_{target}$ is between 1.0 and 1.5°.

18. The method according to claim 1, wherein $P_{target}$ is above 14.2.

19. The method according to claim 18, wherein $P_{target}$ is between 14.2 and 25.

20. The method according to claim 19, wherein $P_{target}$ is between 14.2 and 18.

21. The method according to claim 20, wherein $T°_{target}$ is between 40° and 900° C. and the $t_{target}$ is between 40 seconds to 60 minutes.

* * * * *